(12) United States Patent
Hettinger

(10) Patent No.: US 6,443,420 B1
(45) Date of Patent: Sep. 3, 2002

(54) WIDE-RANGING VALVE

(75) Inventor: Gerhard Hettinger, Ingelfingen (DE)

(73) Assignee: Burkert Werke GmbH & Co., Ingelfingen (DE)

( * ) Notice: Subject to any disclaimer, the term of this patent is extended or adjusted under 35 U.S.C. 154(b) by 0 days.

(21) Appl. No.: 09/147,388

(22) PCT Filed: Apr. 9, 1998

(86) PCT No.: PCT/EP98/02071

§ 371 (c)(1),
(2), (4) Date: Dec. 14, 1998

(87) PCT Pub. No.: WO98/46919

PCT Pub. Date: Oct. 22, 1998

(30) Foreign Application Priority Data

Apr. 14, 1997 (DE) ...................................... 297 06 717 U

(51) Int. Cl.⁷ .......................... F16K 31/02; F16K 31/40; F16K 31/42
(52) U.S. Cl. ................ 251/30.04; 251/30.02; 251/38; 251/44; 251/129.07; 251/333
(58) Field of Search ............................ 251/30.01, 30.03, 251/30.04, 129.07, 43, 44, 38, 30.02, 129.08, 282, 333

(56) References Cited

U.S. PATENT DOCUMENTS

| | | | | |
|---|---|---|---|---|
| 2,251,441 A | * | 8/1941 | Dillman .................... | 251/30.04 |
| 2,379,181 A | * | 6/1945 | Pontius, 3D., et al. .. | 251/30.04 |
| 2,496,553 A | * | 2/1950 | Littlefield .................... | 251/38 |
| 2,622,618 A | * | 12/1952 | Ghormley ................. | 251/30.03 |
| 2,964,286 A | * | 12/1960 | Hoskins .................... | 251/30.04 |
| 2,990,155 A | * | 6/1961 | Selinder ....................... | 251/38 |
| RE25,338 E | * | 2/1963 | Olson ........................ | 251/30.04 |
| 3,154,285 A | * | 10/1964 | Houle ....................... | 251/30.04 |
| 3,405,906 A | * | 10/1968 | Keller ....................... | 251/30.04 |
| 3,684,238 A | * | 8/1972 | Michellone et al. ... | 251/129.07 |
| 3,783,896 A | * | 1/1974 | Jacquemard ........... | 137/630.14 |
| 4,304,264 A | * | 12/1981 | McClintock et al. .... | 251/30.04 |
| 4,679,765 A | * | 7/1987 | Kramer et al. ................. | 251/38 |
| 4,746,093 A | * | 5/1988 | Scanderbeg .............. | 251/30.04 |
| 4,782,862 A | | 11/1988 | Nguyen ................. | 137/630.14 |
| 4,799,645 A | * | 1/1989 | Kramer et al. ........... | 251/30.04 |
| 4,998,561 A | | 3/1991 | Eiichi et al. ........... | 137/630.14 |
| 5,048,790 A | * | 9/1991 | Wells ....................... | 251/30.04 |
| 5,271,599 A | * | 12/1993 | Kolchinsky et al. ...... | 251/30.04 |
| 5,538,026 A | * | 7/1996 | Kazi .............................. | 137/1 |
| 5,762,087 A | * | 6/1998 | Khadim .................... | 251/30.04 |
| 5,769,386 A | * | 6/1998 | Sugiura et al. ............... | 251/37 |
| 6,017,015 A | * | 1/2000 | Heusser ....................... | 251/38 |
| 6,021,997 A | * | 2/2000 | Hell ....................... | 251/30.04 |

FOREIGN PATENT DOCUMENTS

| | | | |
|---|---|---|---|
| DE | 1130235 | | 5/1962 |
| DE | 2361966 | | 6/1975 |
| DE | 2835749 A | | 2/1979 |
| DE | 2909768 A | | 9/1980 |
| DE | 3643318 A | | 6/1988 |
| EP | 0652394 A | | 5/1995 |
| EP | 681128 A | | 11/1995 |
| GB | 721496 | * | 1/1955 .............. 251/30.04 |

* cited by examiner

*Primary Examiner*—George L. Walton
(74) *Attorney, Agent, or Firm*—Nixon Peabody LLP; Stuart J. Friedman

(57) ABSTRACT

The solenoid valve has two fluidic connections (3, 4), a solenoid (5) and a core (8) guided in a cylinder (7) within the solenoid body (6). The solenoid valve (1) is opened as a result of the movement of the core (8) when the solenoid (5) becomes magnetized. After disconnection of the solenoid (5), it is closed due to the force of a spring (27). Both the core and the closing device of the valve (1) are pressure-relieved, in that the end face of the core (8) has an effective surface which corresponds to an effective surface (18) at the valve body (14). The elastic main seat seal (20) is contained in the housing (2). The taper-ended main valve seat (13) and the compensation diameter (12) are housed in combination within a movable seat bushing (11).

6 Claims, 2 Drawing Sheets

WIDE-RANGING VALVE

Figure 1:
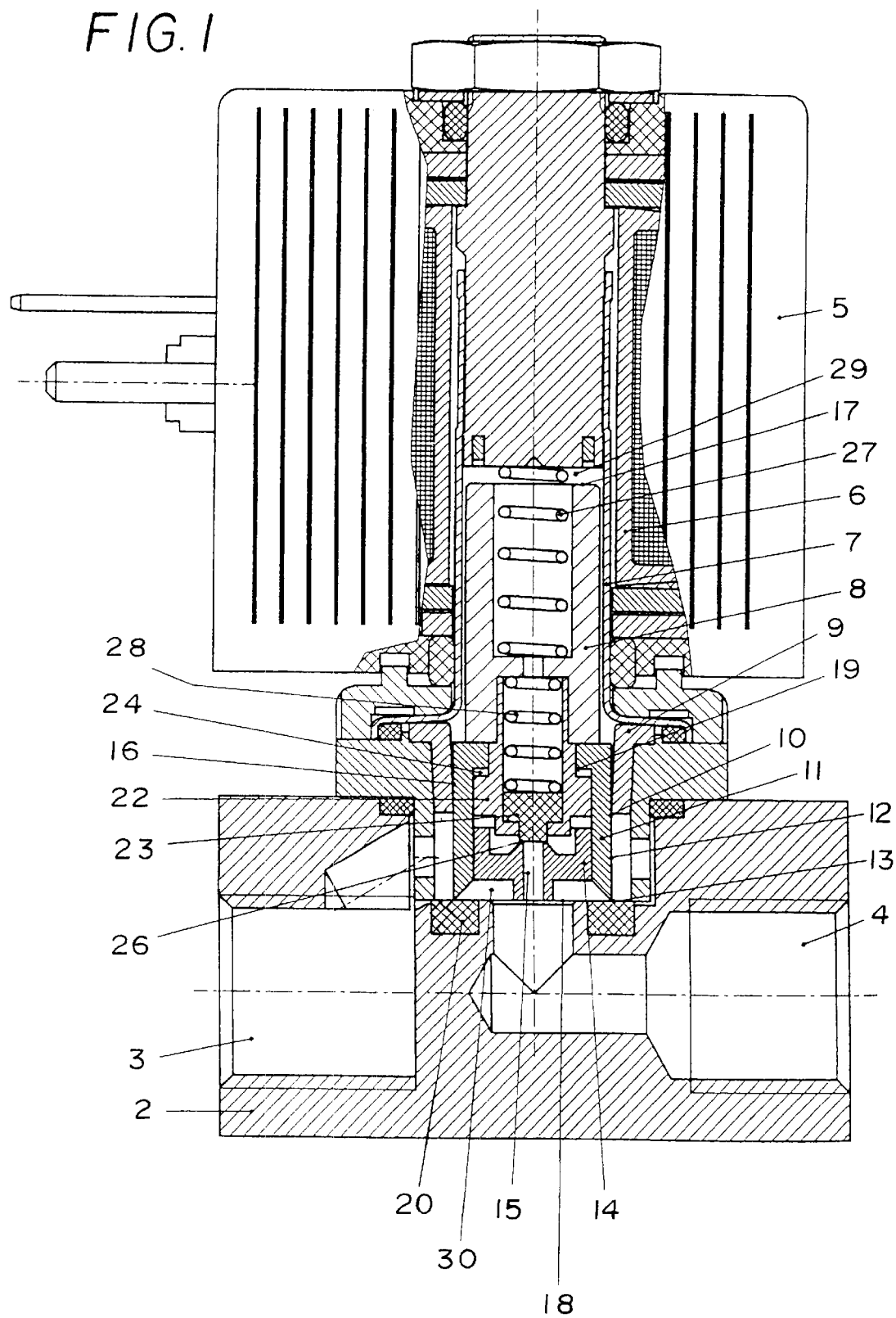

The invention relates to a direct-acting, pressure-balanced and servo-controlled solenoid valve for directing fluids.

A direct-acting, pressure-balanced valve of this nature is known from EP 0 681 128 A1. This valve consists of a housing with at least two connections, as well as of a solenoid and a core which is slideably guided within a hollow cylinder in the solenoid body, and is connected to the valve body. A valve seat is assigned to this valve body. The core has oppositely arranged end faces and a central bore which establishes the connection between the active spaces. The core is here provided with a seal in order to divide two connection spaces, the outer diameter of the seal corresponding to the diameter of the valve seat. This measure ensures that the valve is pressure-balanced. The core, pressure-balanced in this way and containing the seat seal, is pressed by the force of a closing spring onto the valve seat which is rigidly connected to the valve body.

It has been found to be a disadvantage of the valve type mentioned that the main valve seat is formed at the valve housing, and the elastic seat seal is on the mobile side of the core, the membrane or the piston. This means that for a pressure-relieved design it becomes necessary to match the surfaces carefully with respect to each other which, depending on manufacturing tolerances, is never 100% possible.

Also known are servo-controlled valves of the above-mentioned type in which, initiated by the actuation of a magnet, opening and closing forces are generated by means of differential pressure surfaces and the operating medium. To this purpose the valve body is connected to the core by way of a connecting piece. As soon as the solenoid excites the core, only the core is moved in the first movement phase. In the second part of the movement process, the core entrains the connecting piece together with the valve body, and opens the valve. In the case of servo-controlled valves, this second phase is generally assisted by the pressure of the medium which is allowed to flow through a choke bore in the membrane or in the piston into the opposite active space above the piston, thereby assisting the magnetic forces.

When the pilot valve is closed, the pressure above the piston builds up via the choke bore. The main valve is closed by the pressure of the medium assisted by the force of the closing springs, on account of the larger effective surface above the piston. When the pilot valve opens, a relief bore becomes free, which leads to a pressure reduction in the active space above the piston. Because of the coupling between the solenoid core and the piston, the latter also moves upwards during the upward movement.

It has been found to be of particular disadvantage with these servo-controlled valves that there is the danger of the choke bore becoming blocked by dirt particles, or for example in the case of water valves there is the risk of this bore becoming obstructed by deposits of lime scale. This means that the function of the valve is nullified and, furthermore, the application possibilities of these valves become limited to a few, preferably filtered media.

The invention provides a cost-effective, durable and energy-saving valve which combines the advantages of direct-acting valves—reliable closing function at zero pressure and fast opening of the valve—with the advantages of the servo control—switching of high pressures with small magnetic forces and reliable closing.

In the solenoid valve according to the invention, the entire available magnetic force is used exclusively for the opening process. To this purpose a differential pressure surface equal to zero is produced. By this measure, a medium-assisted, reliable and intensified closing is forced after the solenoid is switched off.

Furthermore it is provided that the dirt-sensitive choke bore, generally used in servo-controlled valves, is produced by open channels, which bore is defined by the lip of a robust and temperature-insensitive groove and lip seal in the form of closed rectangles, the lip surrounding the core. This solution achieves to advantage that the to-and-from movement of the core cleans the lip of the groove and lip seal from deposit-forming contamination, such as vapor, and so ensures that the functionality of the valve is not impaired by deposits forming at the groove and lip seal and in the open channel, respectively.

The valves functioning in this way, which may be produced as straight-seat as well as slanted seat valves, may be used universally for directing neutral media, such as water and gases, the temperature range being limited only by the durability of the groove and lip seal. Furthermore, these valves, when made of different materials, for example plastics such as PVC, PVDF, PEEK, can also be used for aggressive media or in analytical and medical applications.

By virtue of the proposed arrangement, complete differential pressure relief in the seat valve is achieved in that the elastic main seat seal is preferably fitted inside the housing, and the seat and balance diameters are arranged by combination in the mobile seat bushing.

In a further advantageous embodiment as a slanted seat valve, a fixed cartridge with a main seat seal is fitted inside the housing. Here, too, the seat and balance diameters are arranged by combination in the mobile seat tube.

The valves provided by the invention may be embodied as 2/2— as well as 3/2—port directional control valves. The design of the valves is distinguished in that it renders possible a simple production and assembly, whereby the manufacturing costs are reduced. Furthermore, the user is provided with an almost maintenance-free valve of long life.

Figure 2:
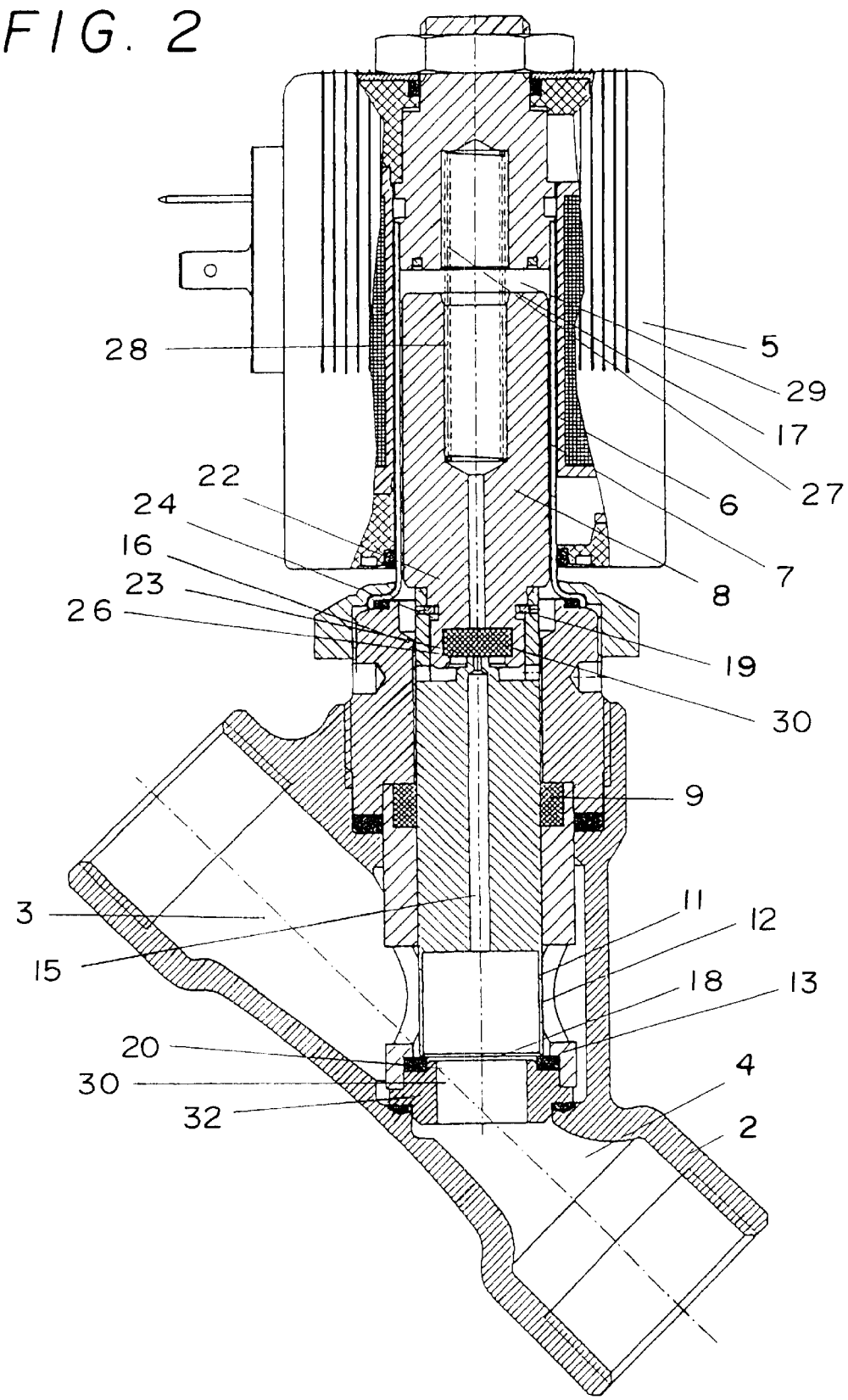

In the following, the invention is explained in greater detail with the help of embodiments represented in the illustrations, in which FIG. 1 shows an enlarged-scale section through a 2/2-port directional control valve having a straight seat, FIG. 2 shows an enlarged-scale section through a 2/2-port directional control having a slanted seat, FIG. 1 represents in section a straight-seat valve in its closed state, embodied according to the invention. The valve 1 represented consists of a housing 2 in which are provided an inlet connection 3 and an outlet connection 4, which are connected to each other by a connection channel 30. The annular elastic main seat seal 20 is radially inset around the outlet connection 4 into the housing. At the housing 2, a coil 5 is arranged in a coil body 6, which contains a guide cylinder 7 within the coil 5, in which a likewise cylindrical core 8—excited by the coil 5 when current-carrying or de-excited after disconnecting the coil 5—is free to move to and from.

A bore inside the core 8 houses a spring 27 which serves to retain the valve 1 in its closing function when the coil 5 is disconnected. Open channels 16 between the core 8 and the coil body 6 serve to allow a flow of the medium into the active space 29 above the effective surface 17 of the core 8.

The core 8 extends within the cylinder 7 up to a connecting piece 22, which contains a further closing spring 28 and the valve plate 23 of the pilot valve. Directly opposite the valve plate 23, a valve seat 26 at a valve body 14 is provided which, by means of a central bore 15, makes a connection between the channel of the pilot valve and the connecting channel 30 between the connections 3, 4. A thin-walled tubular seat bushing 11 adjoins the core 8 downwards in such a way that an intermediate space 24 remains between the connecting piece 22 and a protrusion 19 at the upper edge of the seat bushing 11. The seat bushing 11 annularly surrounds a part of the connecting piece 22, the valve body 14 of the pilot valve and the valve plate 23 with the seat seal 26 of the pilot valve. The movably supported seat bushing 11 tapers off at its lower end into the tapered valve seat 13, and is pressed against the main seat seal 20 by the force of the springs 27, 28. The effective surface 18 of the valve seat 13 is exactly as large as the effective surface 17 at the upper end of the core 8. A groove and lip seal 9 surrounds the seat bushing 11, a sealing lip 10 fitting closely against the seat bushing 11. This serves to throttle the media flow.

The electric circuit to the solenoid 5 is open and the valve 1 is retained in its closed position only by the force of the springs 27, 28. The medium exerts no force on the core 8, the connecting piece 22 and the seat bushing 11, since the effective surface at the upper end face 17 of the core 8 equals the effective surface 18 inside the valve seat 13.

After closing the electric circuit of the solenoid 5, the excitation of solenoid 5 only causes a movement of the core 8 and the connecting piece 22 in a first movement phase. The movement has the consequence that the intermediate space 24 is reduced until the protrusion 19 of the seat bushing 11 finally strikes against the connecting piece 22. Furthermore, the valve seat 26 of the pilot valve is freed, so that the medium flows through the bore 15 and the connecting channel 30 into the outlet connection 4.

Subsequently, after the protrusion 19 of the seat bushing 11 has come to stop at the connecting piece 22, the latter also takes with it the seat bushing 11 together with the valve body 14 of the pilot valve and opens up the connecting channel 30 to the connection 4 for the medium. The valve 1, on account of the equivalent effective surfaces 17, 18, is in a pressure-balanced open position.

Disconnection of the solenoid 5 causes a complete and reliable closure of the solenoid valve 1 because the core, no longer held by magnetic forces, is pressed downwards by the closing spring 27 and the pilot valve by the spring 28, the two valve seats 13, 26 closing in a reliable manner.

FIG. 2 shows an embodiment of the valve 1 according to the invention in slanted seat construction, the function of the valve corresponding to that of the valve in straight-seat construction illustrated in FIG. 1. As a complementary feature, the valve housing 2 contains a cartridge 32 which houses the main seat seal 20.

What is claimed is:

1. A solenoid valve having a valve housing with an inlet and an outlet, an annular valve seat formed in said valve housing between said inlet and said outlet, a solenoid with a movable core, a tubular seat bushing coupled to said core and having a tapered sealing edge for cooperation with said annular valve seat, said core having an end face remote from said annular valve seat and exposed to pressure at the inlet, and further comprising a pilot valve having a valve body including a portion defining a bore for connecting said inlet and outlet when the pilot valve is open, a pilot valve seat accommodated within said seat bushing and a sealing member coupled to said core and cooperating with said pilot valve seat, said seat bushing and said sealing member being movable relative to each other in an axial direction of said core, and said tapered sealing edge of said seat bushing making substantially line contact with said annular valve seat when said valve is closed, the surface area encompassed within the line contact less the area defined by said bore defining an effective surface having the same area as that of said end face of the core for balancing the forces due to pressure at opposite ends of said core, whereby said valve is normally biased into said closed position and said solenoid need overcome only the biasing force to open said valve.

2. The solenoid valve according to claim 1, wherein said sealing member is slidably accommodated in a hollow connecting member attached to said core for joint axial movement.

3. The solenoid valve of claim 2, wherein said seat bushing is mounted on said connecting member for limited axial movement with respect to said core and connecting member.

4. The solenoid valve according to claim 1, wherein said seat bushing has a peripheral surface exposed to pressure at the inlet, said surface being engaged by a lip seal permitting a throttled flow of fluid between said inlet and a space within said solenoid wherein said core is slidably accommodated.

5. The solenoid valve according to claim 1, wherein said sealing member is biased against said pilot valve seat by a spring bearing on said core.

6. The solenoid valve according to claim 1, wherein said pilot valve seat is formed on a valve body surrounded by and connected to said seat bushing.

* * * * *